United States Patent Office 2,734,342
Patented Feb. 14, 1956

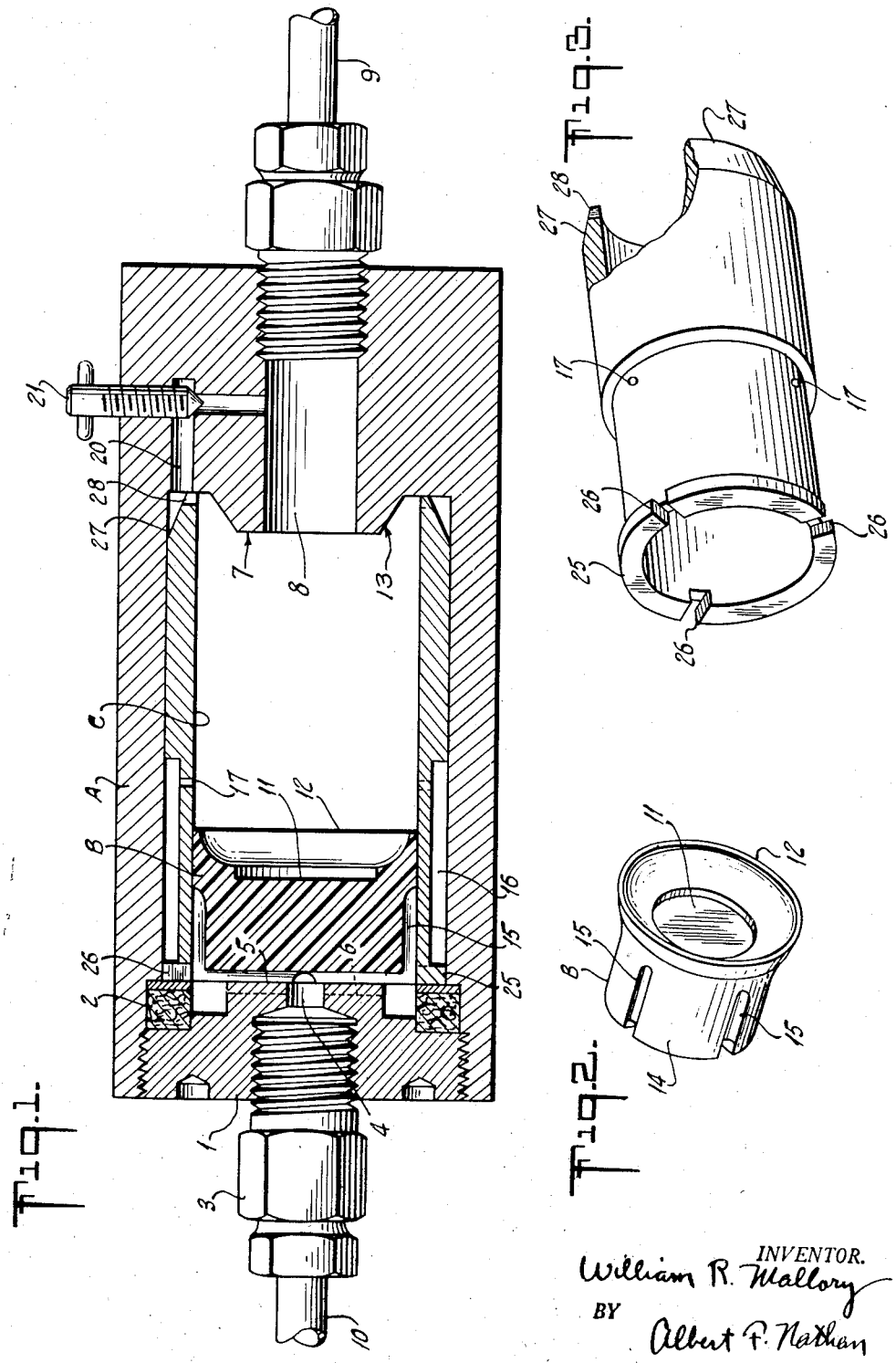

2,734,342

SAFETY DEVICE FOR HYDRAULIC BRAKE SYSTEMS

William R. Mallory, Phillipsburg, N. J.

Application May 11, 1951, Serial No. 225,870

4 Claims. (Cl. 60—54.5)

This invention is concerned with improvements in safety devices for hydraulic brake-systems of motor vehicles. In such systems, each wheel embodies a pair of brake-shoes which are, by springs, normally held out of binding contact with the brake-drum to prevent drag. Pistons in small cylinders serve to move such shoes against the pull of said springs into frictional engagement with the brake-drum. This is accomplished by the displacement of the necessary amount of fluid under the foot-actuated movement of a master-piston. After this initial movement, which is in the nature of taking up backlash, has been performed, an increase of the foot-pressure produces no material movement of the pistons, but it does increase the fluid pressure and consequently the force exerted by the brake-operating pistons.

Inasmuch as the master-cylinder is piped likewise to each subordinate cylinder, it is obvious that any leak more than trivial, or a fracture in any of the lines, would render the entire system inoperative. Various units have therefore been proposed from time to time with the objective of automatically closing the flow through any line that developed a leak.

To be practical, any such safety-unit must be as simple as possible in structure and likewise adaptable to easy installation in close proximity to the master-cylinder, and in a line that branches to the pair of front wheels so as to ensure straight-line braking. Likewise as to the pair of rear wheels. It must not in any way interfere with the normal action of the system and must not give rise to a drag on the wheels. On the other hand, whenever the displacement of fluid by the master-piston becomes super-normal, as through a material leak, the unit must forthwith automatically seal the damaged line and keep it sealed until repaired. Thereupon it must admit of being easily restored to normal.

My invention provides a mechanism for accomplishing these results. A preferred embodiment is shown, by way of example, in the accompanying drawing, in which:

Fig. 1 is an enlarged axial cross-section of the unit embodying the invention;

Fig. 2 is a perspective of a floating valve member forming an element of the unit and made of an elastic fluid-resisting material such as synthetic rubber or "neoprene";

Fig. 3 shows a sleeve or liner in sectional perspective.

Within the cylinder A is a sleeve C within which is an imperforate free-floating valve-member B which normally occupies a position near or against the inlet end of the cylinder which is closed, as by a plug 1 and gasket 2 which may be metal-faced. A conventional nipple 3 fastens the inlet pipe 10 from the near-by master-cylinder to the plug which has a central bore 4 and provides a seat 5 having cross-slots 6; all to permit free flow into the cylinder so as to keep full a channel 16, between the sleeve and cylinder even when the valve-member happens to rest against the seat.

At its outlet end, the cylinder A has a compound valve-seat 7 with a central bore 8 which normally is open to the nipple of the outlet pipe 9 which leads to a pair of brake pistons. The floating valve-member B has a face 11 adapted accurately to abut the valve-seat 7 under abnormal conditions to arrest any continuation of flow through the cylinder.

Coming to the essential and distinguishing characteristics of the invention, it will be observed that the rubber valve-member B is molded in one piece and has only a single forwardly projecting feathered flange 12 or annulus at its forward face; which flange extends cup-like around and beyond the center-face of the valve-member. It is important that the valve-member be in one piece, and not composite, because otherwise the rubber portion would in time lose adherence to any dissimilar material. Around the valve-seat 7, there is a moat 13 proportioned to receive the said flange and of a depth such that the edge of the flange may seat on the bottom of the moat to effect a closure while at the same time permitting the central face of the rubber valve-member to seat itself firmly against the valve-seat.

The periphery of the rear or body-portion 14 of the valve member has an equi-spaced series of longitudinal flutes or grooves 15 the rear ends of which open into the chamber of the cylinder. This is important for they serve to distribute the fluid between the body and the wall of the cylinder to lubricate and promote easy movement of the valve-member and, under certain conditions, promote the passage of small increments of the fluid past the feather edge towards the exit end; but resists counter-flow.

By virtue of this formation, in cooperation with a feature to be described, any tendency of the floating valve-member to creep towards the exit end is overcome so that, during normal operation, said valve-member will advance about three-eighths of an inch at each depression of the foot-pedal and will correspondingly retreat at each release of the brakes.

Unless otherwise provided for, such increments as do pass the valve-member, would tend to build up pressure in the cylinder ahead of the valve-member and the result would be a drag on the brakes. However, it will be seen that the rear-half of the cylinder provides an annular channel 16 which is open at its rear end to be in unrestricted communication with the inlet end of the master cylinder so as always to be filled with fluid corresponding in pressure with that in the pipe 10 from the master-cylinder. At a region somewhat ahead of the valve-member B when in its retracted position against the end of the cylinder, there is a circumferential series of equi-spaced pores 17 which provide a much restricted communication between the chamber of the cylinder and the said annular channel 16. In the form shown, there are three of such pores, the diameter of each being preferably about 3/100 of the diameter of the bore, or the respective areas of one jet to the bore is 1/1000. Three jets would thus be 3/1000 of the area of the bore; twelve jets 12/1000, etc.

Inasmuch as these pores cannot be properly drilled or punched from the inside by means of ordinary equipment, there is fitted into the cylinder a sleeve C extending the full length of the cylinder so as to provide a smooth continuous bore for the travel of the valve-member. The rear half of this sleeve has a reduced periphery to provide the aforesaid annular channel 16 shown by Fig. 1. This sleeve can easily be turned and drilled before assembly to provide any desired number and size of pores; the aggregate area of which will not deviate materially from the ratio prescribed in the foregoing. At its rear end, the sleeve has a shoulder 25 notched at intervals to admit fluid into the annular channel 16, and it is tapered as indicated by 27, at its forward end and has notches 28 to provide a re-setting bypass.

If the diameter of the several pores be materially increased, then the device will not function satisfactorily to return the piston valve to its seat at the inlet, affecting adversely the functioning. On the other hand, a decrease in the area of each single jet causes added boost in the exit end. When made as thus prescribed, the rubber valve-member will continue to oscillate as stated in the rear zone of the cylinder throughout normal brake applications, and there will be no build-up of drag on the brakes by reason of an increase of pressure in the portion of the cylinder ahead of the valve-member through increments of fluid advancing past the feather flange 12 under periodic thrusts of the master-piston. All such increments will return through the pores after the valve member 8 seats on the inlet end, back into the portion of the cylinder at the rear of the valve member until equilibrium is obtained.

In the event of a major fracture in a line, the fluid in the unit installed therein (near the master cylinder) will forthwith flow out of the exit end of the unit, and the replacement fluid entering it will cause the rubber valve-member to travel to the exit end and thereupon arrest all further discharge, permitting a loss of fluid no greater than that originally in the cylinder ahead of the valve-member.

The same is true of all minor leaks when and if the rubber valve-member occupies a position ahead of the pores 17 and if it be in its rearmost position, an insignificant portion of the flow may initially pass through the pores 17 for the short period preceding the shift of the valve-member past the pores which are thereupon sealed off.

Should the leak be trivial and either less or equal to the amount capable of passing the pores, then whether the valve-member will shift depends upon the relation of its friction to that imposed on the fluid that may pass through the pores, but in either event, as these pores are minute, as previously explained, the loss of fluid will be negligible during any intermediate period or, not at all if, as aforesaid, the valve-member was to rest in a position covering or ahead of the pores. If larger diameter holes (in case of three) be used, or if the structure embodied what may be termed a substantial by-pass, this desirable action would not be attained. For any leak not exceeding the amount of fluid that can be conveyed by a by-pass will not cause a shift of the floating valve-member, and the unit would fail as a safety device. For example, in a unit as herein specified, it has been found that a single pore of 0.60" dia. yields no boosting effect.

It remains to describe the means for re-setting the unit after a break in the line has been repaired. This requires that the rubber valve-member be dislodged from its sealing contact with the exit end of the cylinder, and be shifted sufficiently towards the inlet end to have room to oscillate under depressions of the foot-pedal without being brought into contact with the exit end.

This means consists of a short normally closed by-pass 20 extending from the bottom of the moat through the cylinder wall to the outlet bore 8, the closing being done by a needle-valve 21. Upon the completion of a repair, the brake-cylinder and its pipe to the unit will, of course, be more or less depleted of fluid, and this lost fluid requires to be replenished. This is done by opening the needle-valve, and then by pumping the foot-pedal amounts of fluid will be injected into and through the unit by reason of the notches 28. The feathered-flange is also flexed by the fluid passing into the by-pass and the pipe and brake cylinder thus become filled. Thereafter, a continuation of the pumping will build up a back-pressure in the bore 8 which will unseat the valve-member which, because of increments passing its feathered-flange will intermittently creep to the rear until its normal location is attained. The needle-valve is then tightened to close the by-pass and the unit is conditioned for normal usage.

It has been found by actual usage, that a unit constructed as aforesaid exhibits a "boosting" action when the brake is applied. There occurs an excess of pressure on the forward side of the valve member. This apparently is a dynamic consequence of jetting by the pores, for it is not manifested if the diameter of the pores is excessive. For example, as stated, if a single hole only $\frac{1}{16}''$ be substituted, but otherwise unchanged, there will be a boosting.

While the preponderance of pressure on the forward side of the floating valve member exists it produces a continuing pressure on the mechanical elements of the brakes. This is due to the fact that, to move such elements into a given pressure-contact, the ever-present mechanical friction must be overcome by a corresponding excess pressure of the operating fluid. The same friction will thereafter act to hold the mechanical parts in place when merely the momentary excess has abated, as if by a snubbing action.

As earlier explained, the adoption of pores is important also in inhibiting brake-drag, and the aggregate area and number of these pores should be adequate, during the intervals between pedal depressions for the increments introduced thereby ahead of the valve-member to seep back through them when and if the valve-member happens to bear against the inlet end of the cylinder.

It is especially noteworthy that the herein disclosed structure has been contrived so as to be destitute of springs, relief valves and the like, all of which are detrimental to reliability in a safety device. Also, of importance is the employment of symmetrically arranged pores 17 and flutes 15 of the valve member. This ensures smooth action of the valve member, without which it would tend to cock and bind.

I claim:

1. A safety device for hydraulic brake systems which comprises a closed cylinder having an inlet at one end and an outlet at the opposite end, said safety device having a passage from the inlet end of said cylinder and a restricted opening from said passage to the interior of said cylinder between the inlet and outlet ends thereof, the end of said cylinder about said outlet projecting inwardly to form a valve seat and an annular recess about said valve seat, said safety device having a by-pass from the outer edge of said recess to said outlet, a closure valve in said by-pass, and a piston of resilient material slidable from a position between said inlet and said restricted opening to seat on said valve seat, said piston having an annular flange projecting into the annular recess about said valve seat to close against said by-pass when said piston seats on said valve seat.

2. The safety device of claim 1 in which said piston has grooves extending from the side facing said inlet to said annular flange.

3. A safety device for hydraulic brake systems which comprises a hollow closed outer cylinder having an inlet at one end and an outlet at the opposite end, the end of said cylinder about said outlet projecting inwardly to form an annular valve seat and an annular recess about said valve seat, an inner cylinder within and fitting the inner surface of said outer cylinder from end to end, the outer surface of said inner cylinder having a recess from the inlet end to a distance short of the outlet end to form a passage and having a restricted opening to the interior of said inner cylinder, a solid piston of resilient material within said inner cylinder between the inlet end and said restricted opening and movable to the outlet end to seat on said valve seat, said piston having an annular flange fitting the surface of said inner cylinder to enter the annular recess about said annular valve seat when said piston seats on said valve seat, said device having a by-pass passage from within said inner cylinder through said inner cylinder at its outlet end and through said outer cylinder to said outlet and a closure valve in said by-pass passage.

4. The safety device of claim 3 in which said piston has longitudinal grooves extending from its inlet end to said annular flange for the passage of fluid upon inward deflection of said annular flange.

References Cited in the file of this patent

UNITED STATES PATENTS

| 1,905,077 | Walker | Apr. 25, 1933 |
| 2,140,027 | Myllniemi et al. | Dec. 13, 1938 |
| 2,340,462 | Gallup et al. | Feb. 1, 1944 |
| 2,353,191 | Samiran | July 11, 1944 |
| 2,451,828 | Herriott | Oct. 19, 1948 |
| 2,585,511 | Sparks et al. | Feb. 12, 1952 |